(12) United States Patent
Blum

(10) Patent No.: US 9,162,197 B2
(45) Date of Patent: Oct. 20, 2015

(54) MIXING AND METERING DEVICE FOR MIXING AND METERING CHEMICALS

(76) Inventor: Holger Blum, Teufen (CH)

(*) Notice: Subject to any disclaimer, the term of this patent is extended or adjusted under 35 U.S.C. 154(b) by 0 days.

(21) Appl. No.: 14/236,898

(22) PCT Filed: Aug. 3, 2012

(86) PCT No.: PCT/EP2012/065245
§ 371 (c)(1),
(2), (4) Date: Apr. 10, 2014

(87) PCT Pub. No.: WO2013/017685
PCT Pub. Date: Feb. 7, 2013

(65) Prior Publication Data
US 2014/0219047 A1  Aug. 7, 2014

(30) Foreign Application Priority Data
Aug. 4, 2011  (DE) .................... 20 2011 050 903 U

(51) Int. Cl.
*B01F 15/02* (2006.01)
*B01F 3/08* (2006.01)
*B01F 5/06* (2006.01)
(Continued)

(52) U.S. Cl.
CPC .......... *B01F 15/0216* (2013.01); *B01F 3/0861* (2013.01); *B01F 5/0647* (2013.01); *B01F 5/102* (2013.01); *B01F 15/0243* (2013.01);
(Continued)

(58) Field of Classification Search
CPC .... B01F 5/0647; B01F 5/102; B01F 15/0216; B01F 15/0243; B01F 15/0291; B01F 3/0861; B01J 3/006; B01J 3/02; B01J 3/044

USPC ............. 366/152.2, 160.2, 162.4, 181.8
See application file for complete search history.

(56) References Cited

U.S. PATENT DOCUMENTS 2,382,871 A * 8/1945 Gerhold ................. 516/20
3,486,862 A * 12/1969 Unterstenhoefer ........ 422/133
(Continued)

FOREIGN PATENT DOCUMENTS

CN    1272804 A    11/2000
CN    201644042 U    11/2010
(Continued)

OTHER PUBLICATIONS

International Search Report for PCT/EP2012/065245 dated Nov. 20, 2013.
(Continued)

*Primary Examiner* — Charles Cooley
(74) *Attorney, Agent, or Firm* — Nixon Peabody LLP; Joseph Bach, Esq.

(57) ABSTRACT

A mixing and metering device for mixing and metering liquid chemicals comprises a circulation pump having a suction port and a pressure port, a pipe coil, the contents volume of which is dimensioned such that the chemicals metered into the device have a residence time sufficient for the chemical reaction, a choke tube which guides the circulation stream exiting from the pipe coil, with formation of a choke point, from the outlet of the pipe coil to a metering conduit which is arranged between the choke tube and the suction port of the circulation pump and at least two metering valves, and also a falling tube which is connected to the choke tube and has a vacuum flange for connection of the mixing and metering device to a vacuum device.

12 Claims, 3 Drawing Sheets

(51) Int. Cl.
*B01F 5/10* (2006.01)
*B01J 3/00* (2006.01)
*B01J 3/02* (2006.01)
*B01J 3/04* (2006.01)

(52) U.S. Cl.
CPC . *B01J 3/006* (2013.01); *B01J 3/02* (2013.01); *B01J 3/044* (2013.01); *B01F 15/0291* (2013.01)

(56) References Cited

U.S. PATENT DOCUMENTS

| | | | |
|---|---|---|---|
| 8,864,367 B2 * | 10/2014 | Hanada et al. | 366/339 |
| 2007/0291582 A1 | 12/2007 | Feil | |
| 2011/0128814 A1 * | 6/2011 | Hanada | 366/339 |
| 2011/0199855 A1 * | 8/2011 | Hanada | 366/165.1 |
| 2012/0307589 A1 * | 12/2012 | Hanada et al. | 366/339 |
| 2014/0219047 A1 * | 8/2014 | Blum | 366/152.2 |

FOREIGN PATENT DOCUMENTS

| | | | |
|---|---|---|---|
| CN | 102781865 A | | 11/2012 |
| DE | 102006026254 A1 | | 12/2007 |
| DE | 102012006049 A1 | * | 10/2013 |
| EP | 2336093 A1 | | 6/2011 |
| FR | 2383887 A1 | * | 10/1978 |
| WO | 99/04892 A1 | | 2/1999 |
| WO | 2009151322 A1 | * | 12/2009 |
| WO | 2011059113 A1 | * | 5/2011 |

OTHER PUBLICATIONS

Office Action in Chinese Patent Application No. 201280038580.2 dated Apr. 3, 2015.

* cited by examiner

MIXING AND METERING DEVICE FOR MIXING AND METERING CHEMICALS

RELATED APPLICATIONS

The present application is the national phase of International Application No. PCT/EP2012/065245, filed on Aug. 3, 2012, which claims the benefit of priority to German Patent Application No. 202011050903.6, filed on Aug. 4, 2011, and the disclosures of which are hereby incorporated herein by reference in their entireties.

BACKGROUND

The invention relates to for mixing and metering of liquid chemicals as well as obtaining a liquid reaction product under vacuum conditions.

SUMMARY

The invention is based on the object to provide a mixing and metering device for mixing and metering chemicals under vacuum conditions which can carry out the mixing and metering process securely and satisfactory also under non-stationary conditions and, in particular, in inclined position and during movement.

For this purpose, a mixing and metering device for mixing and metering of liquid chemicals is disclosed which comprises a circulating pump having a suction port and a pressure port, a pipe coil the content volume of which is dimensioned such that the chemicals metered into the device have a residence time sufficient for the chemical reaction, a choke tube which guides the circulation stream exiting from the pipe coil, with formation of a choke point, from the outlet of the pipe coil to a metering conduit which is arranged between the choke tube and the suction port of the circulation pump, and at least two metering valves, and also a falling tube which is connected to the choke tube and has a vacuum flange of the mixing and metering device to a vacuum device. In the mixing and metering device of the invention, the chemicals are metered into a circular stream the volume content of which is dimensioned such that the metered chemicals have a sufficient residence time for the chemical reaction that the circular stream is downed at a choke point, and a reaction material stream out of liquid reaction material is sucked of at the choke point from the circular stream. The device of the invention can carry out the task of mixing and metering of chemicals under vacuum also under non-stationary conditions and, in particular, under an inclined position and during movement.

A preferred embodiment of the mixing and metering device of the invention is characterized in that the pipe coil is arranged standing up vertically and has an input at the bottom and an output on the top, that the choke tube guides the circular stream exiting from the tube coil from the outlet of the tube coil downwards to a metering conduit which is arranged horizontally between the choke tube and the suction stop of the circulation pump, and that the falling tube is connected to an end of the choke tube arranged on top above the level of the tube coil, and comprises, at a lower end, a vacuum flange for connection of the mixing and metering device to a vacuum device. By means of the upstanding arrangement of the tube coil and the special arrangement of the choke tube and the falling tube with respect to the tube coil, the device of the invention is, in an advantageous way, less prone to changes of orientation in case of a non-stationary operation, an inclined arrangement or a movement of the device, for example, when it is mounted on a vehicle.

A further preferred embodiment of the mixing and metering device of the invention is characterized in that the metering valves are glandless and are embodied in form of bellows valves. Such metering valves are particularly well adapted for controlling liquid chemicals.

A further preferred embodiment of the mixing and metering device of the invention is characterized in that the circulating pump is a rotary pump whereby an effective flow rate of the pump smooth for the chemicals, is ensured.

A further advantageous embodiment of the mixing and metering device of the invention is characterized in that the pipe coil is embodied as a meander type, upstanding flat tube coil whereby the space requirement for the tube coil is reduced without making the tube coil smaller in its volume.

A further preferred embodiment of the mixing and metering device of the invention is characterized in that the choke tube is connected to the outflow flange of the tube coil via a flange stub at a T-piece into which the circular stream is introduced such that it is deviated in its movement direction in the T-piece. In this arrangement of the T-piece as choke point, the circular stream exiting the tube coil directly impinges on the closed back wall of the T-piece so that, thereby, and by deviating the circular stream in the T-piece, a choke effect is achieved. This choke effect can be used, in an advantageous way, to remove liquid reaction material out of the circular stream by means of a vacuum which is present at the exit of the device.

A further preferred embodiment of the mixing and metering device of the invention is characterized in that, at the top at the T-piece, a tube reduction piece is connected whereby the stream of the reaction material in flow direction after the choke point is calmed down with respect to turbulences.

A further preferred embodiment of the mixing and metering device of the invention is characterized in that, at the T-piece, a riser tube is connected through which the choke tube is prolonged beyond the level of the tube coil whereby, in an advantageous way, a further smoothing of the reaction material stream is achieved.

A further preferred embodiment of the mixing and metering device of the invention is characterized in that the diameter of the falling tube is smaller than the diameter of the choke tube whereby, in particular, the inner diameter of the choke tube, of the tube conduits (except the falling tube) as well as the inner diameter of the tube coil is selected such that, with a predetermined pump capacity of the rotary pump and a predetermined dynamic viscosity of the reaction material, the Reynolds number is larger than 2300, and that the inner diameter of the falling tube is so wide that the thickness of the film of the reaction material flowing downwards on the inside of the falling tube, is a fraction of the inner diameter of the falling tube. Thereby, in an advantageous was, the fact is taken into account that, on the one hand, a sufficiently strong stream should flow in the tube coil and the choke tube whereas, in the falling tube, only a liquid film out of reaction material is rinsing downwards at the walls.

A further preferred embodiment of the mixing and metering device of the invention is characterized in that the hydraulic connection between the falling tube and the riser tube comprises a transfer conduit. Thereby, in an advantageous way, it can be achieved that the reaction material liquid does not take up the complete diameter of the conduit in the transfer conduit such that the vacuum present in the falling tube can become active also in the transfer conduit.

A further preferred embodiment of the mixing and metering device of the invention is characterized in that the transfer conduit is arranged in its height above the upper tube of the tube coil whereby the reaction material is guided from the choke point upwards and through the falling tube downwards within which a vacuum is generated. Thereby, it is additionally ensured that, if the device in operation is subject to variations and changes in position, the operation in the tube coil is not influenced since the liquid level in the tube coil is always lower than in the transfer conduit.

A further preferred embodiment of the mixing and metering device of the invention is characterized in that a drainage conduit with a drainage valve is provided between the suction port of the circulation pump and the falling tube. Thereby, the device can be drained in an easy way after closing of operation in order to avoid disadvantages of a consequences effect of the chemicals.

BRIEF DESCRIPTION OF THE DRAWINGS

Further advantages, features and potential applications of the present invention may be gathered from the description which follows, in conjunction with the embodiments illustrated in the drawings.

Throughout the description, the claims and the drawings, those terms and associated reference signs will be used as are notable from the enclosed list of reference signs. In the drawings is shown

DETAILED DESCRIPTION

Figure 1:
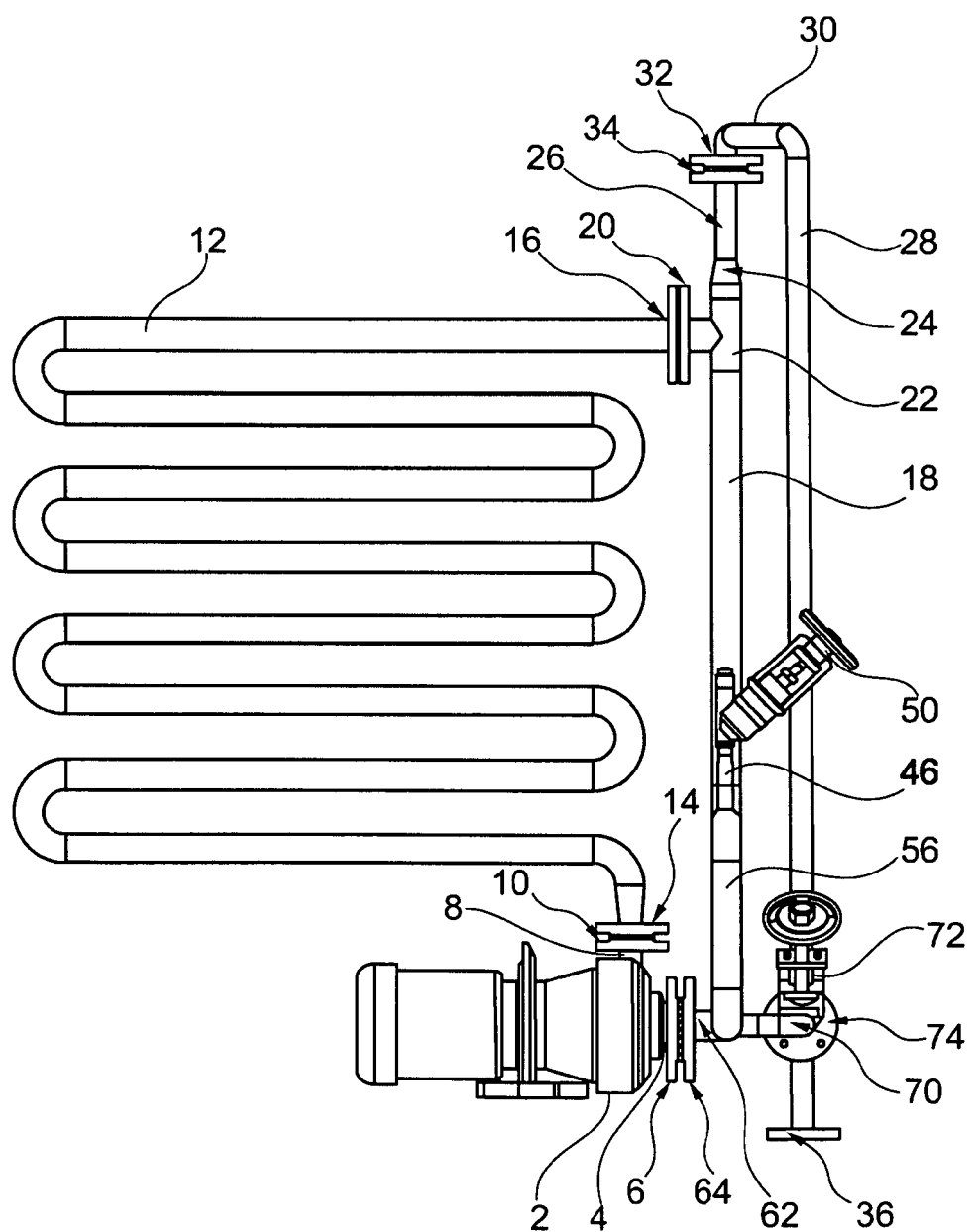
FIG. 1 is a side view of the device.

The device of the invention according to FIG. 1 comprises a mixing and circulating pump 2 preferable in form of a rotary pump. The mixing and circulating pump 2 comprises a suction stub 4 with a flange 6 and a pressure stub 8 with a flange 10.

The device of the invention comprises a tube coil 12 the volume content of which is dimensioned that the chemicals metered into the device have a sufficient dwelling time for the chemical reaction. Preferably, the tube coil 12 is arranged like a meander as a flat tube coil as shown in FIG. 1.

The circular stream of the chemicals moved through the mixing and circulating pump 2 enters through a flange stub 14 at the bottom into the tube coil 12. The moved circular stream of the chemicals exits on the top from tube coil 12 through a flange stub 16.

The device of the invention comprises a choke tube 18. The choke 18 is arranged at an angle of 90 degrees in flowing direction of the circular stream exiting from the tube coil. The hydraulic separation of the liquid reaction material from the circular stream is beginning self-operated in the choke tuber of the invention. The choke tube 18 is hydraulically connected through a flange stub 20 and a T-piece 22 to the flange stub 16. According to the invention, at the top at the T-piece 22 a tube reduction piece 24 is welded. The tube reduction piece 24 removes the current turbulences of the circular current such that the gated-off liquid reaction material flows into the riser tube 26 being hydraulically smoothed.

The device of the invention comprises a falling tube 28. The hydraulic connection between the falling tube 28 and the riser tube 26 is effected by a transfer conduit 30. The diameter of the falling conduit 28 is smaller than the diameter of the choke tube 18 and is dimensioned such that the liquid reaction material gated-out from the device only rinses down as a liquid film on the inside of the falling tube 28. Consequently, a vacuum is present in the falling tube 28 if, as provided according to the invention, at the lower end of the falling tube 28, a vacuum flange 36 of the device a vacuum pre-stage is connected. The transfer conduit 30 is only partially filled with the gated-off liquid reaction material. Consequently, the same sub-pressure as in falling tube 28 is present in this conduit 30.

As can be seen from FIG. 1, the transfer conduit 30 is, as concerns its height, arranged above the upper tube of the tube coil 12 and is connected to the riser tube 26 by means of the flange stub 32 and 34. Accordingly, the transfer conduit acts as a self-acting level control in that, in the complete device, the gated-out liquid reaction material cannot rise higher than up to the transfer conduit 30.

Figure 2:
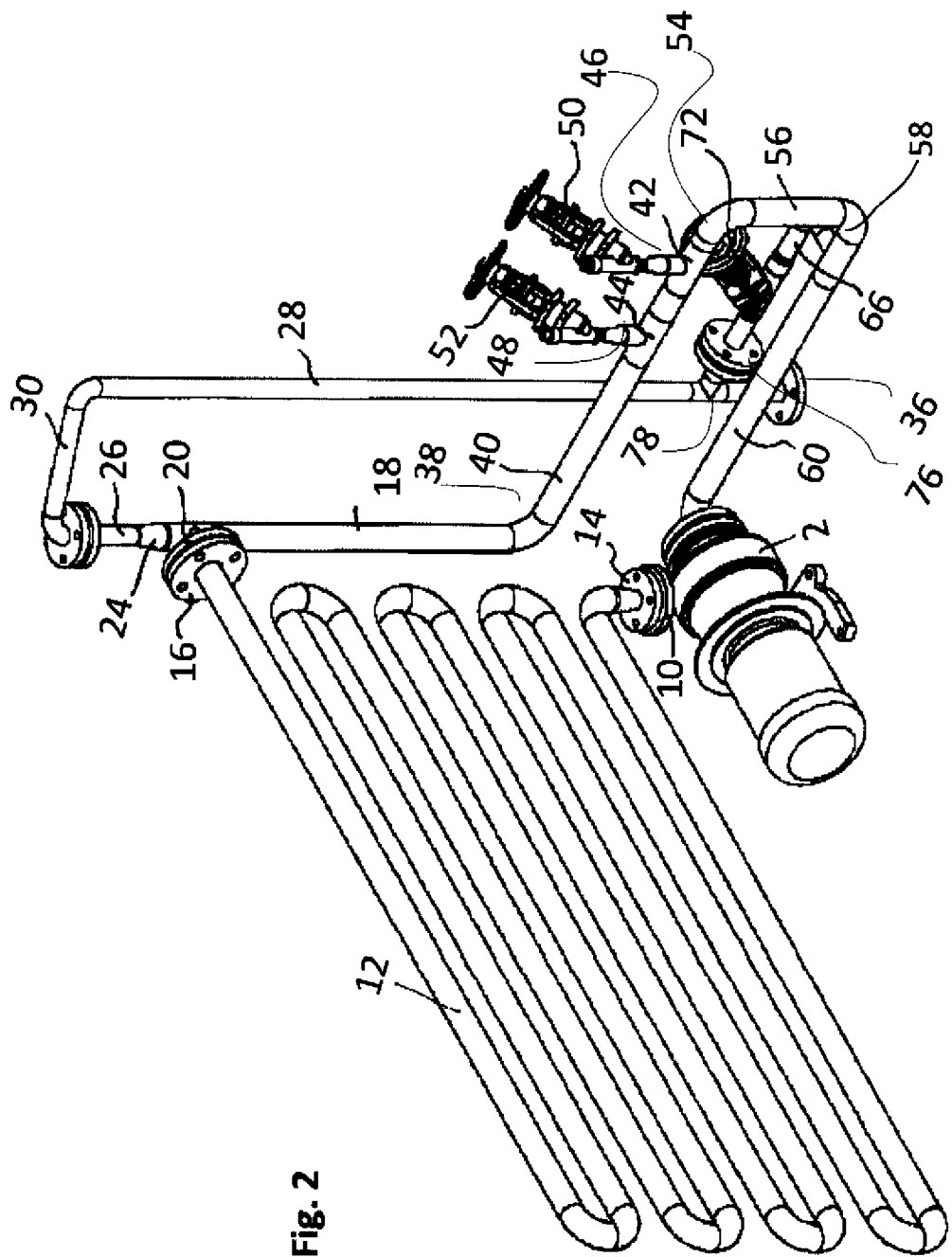
FIG. 2 is a perspective view of the device in another angle of view as FIG. 1.

As can be seen from FIG. 2, the choke tube 18 opens out into a horizontal upper metering conduit 40 through a 90 degree tube bend 38. In this upper metering conduit 40, T-pieces 42 and 44 are inserted. These T-pieces 42 and 44 have 90 degree tube branch connections which comprise a smaller diameter as compared to the upper metering conduit 40.

To the tube bends of the T-pieces 42 and 44, conical reduction pieces 46 and 48 are welded, and, thereon, furthermore the metering valves 50 and 52 are provided. Preferably, the metering valves 50 and 52 are arranged glandless and in the shape of bellows valves.

Figure 3:
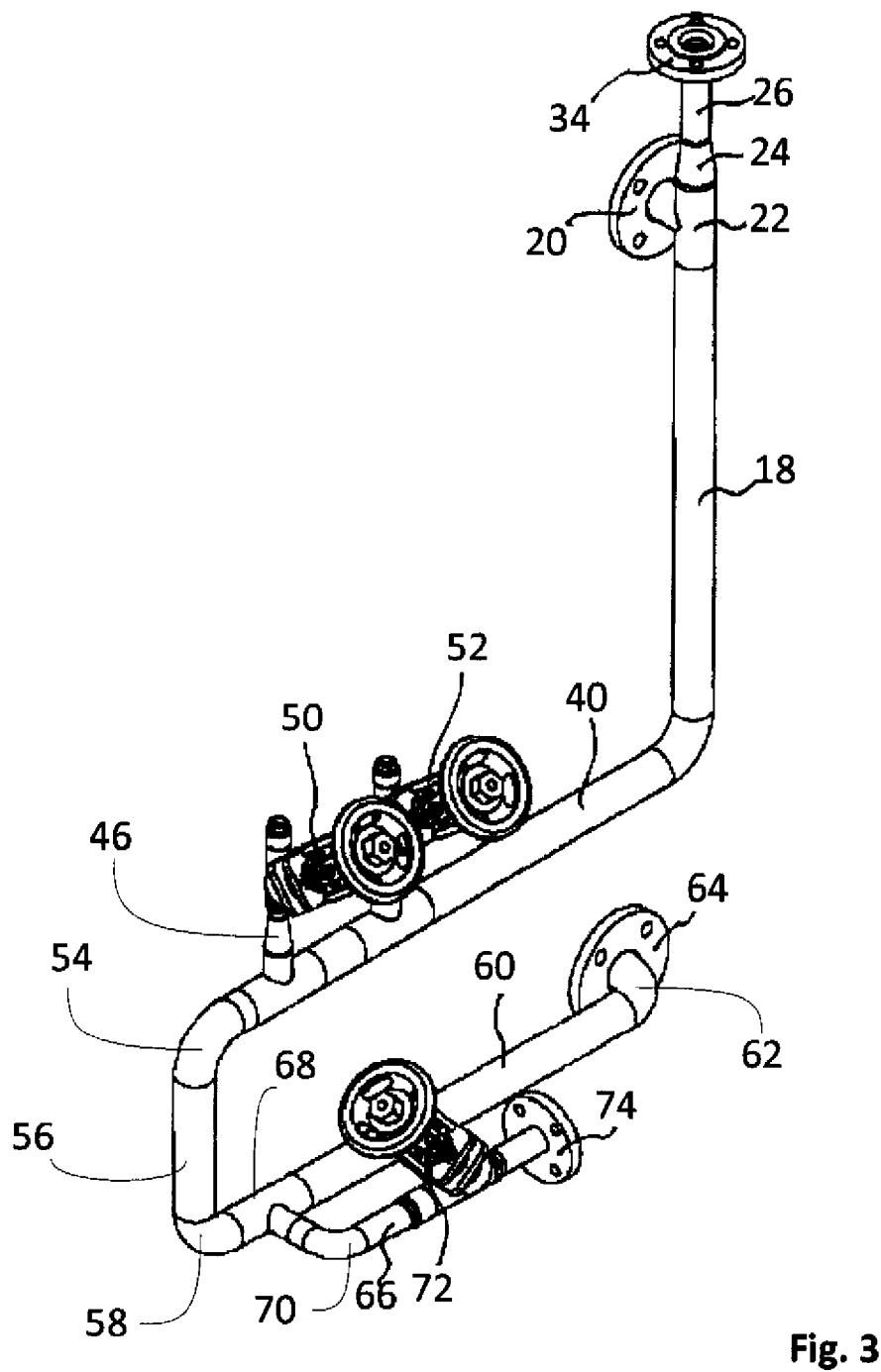
FIG. 3 is a detail view of the falling tube and the choke tube with connected armatures.

As can be seen from FIG. 2 and from FIG. 3, the upper horizontal metering conduit 40 is connected by means of a 90 degree tube bend 54 to the vertical connection tube conduit 56, and this is again hydraulically connected by means of a 90 degree tube bend 58 with the lower horizontal metering conduit 60.

The circular stream of the reaction liquid flows from the tube coil 12, except the gated-out reaction liquid, in the choke tube 18 and through the tube conduits 40, 56 and 60 as well as through the 90 degree tube bend 62 which is connected to the suction stub 4 of the rotary pump 1 by means of the flange 64.

The inner diameter $d_{Rohr}$ of the suction tube, of the tube conduits 40, 56, 60 as well as the inner diameter of the tube coil is selected such that, with a predetermined pump capacity $Q_{Pump}$ (m³/s) of the rotary pump 2 and a predetermined dynamic viscosity μR (²m/s) of the reaction material for the dimensionless Reynolds number RE:

$$RE = Q_{Pump}/(0.25 * \Pi * d_{Rohr} \mu R) > 2300$$

is true.

The inner diameter $d_{iF}$ (m) of the falling tube 28 is so wide that, with respect to the film thickness $S_{Film}$ (m) the reaction material flowing downwards at the inside of the falling tube 28:

$$S_{Film} \leq d_{iF}/6$$

is true.

The device of the invention comprises also a drainage conduit 66. This drainage conduit 66 branches off through a T-piece 68 and a 90 degree tube bend 70 from the lower horizontal metering conduit 60 and is hydraulically connected to a flange 74 through a shut-off valve 72. The flange 74 is connected to a flange 76 which again is welded to a T-piece 78. The T-piece 78 is a part of the falling tube 28 as can be seen from FIG. 2.

During the metering operation, the shut-off valve 72 which is, preferably, glandless and is arranged in the shape of a bellows valve is closed. After the cessation of the metering operation, the shut-off valve 72 can be opened whereby all of the liquid reaction material automatically flows out of the tube coil 12, the rotary pump 2 and the metering conduits 40, 56, 60 out of the device at the vacuum flange 26 so that the device of the invention becomes free of liquid.

LIST OF REFERENCE SIGNS 2 rotary pump
4 suction stub
6 suction flange
8 pressure stub
10 pressure flange
12 planar tube coil
14 inlet flange
16 outlet flange
18 choke tube
20 connection flange
22 T-piece
24 tube reduction piece
26 riser tube
28 falling tube
30 transfer conduit
32 flange transfer conduit
34 flange riser tube
36 vacuum flange
38 tube bend
40 upper metering conduit
42 T-piece, reduced branch
44 T-piece, reduced branch
46 conical reduction piece
48 conical reduction piece
50 metering valve
52 metering valve
54 tube bend
56 connection conduit
58 tube bend
60 lower metering conduit
62 tube bend metering conduit
64 metering flange
66 drainage conduit
68 T-piece reduced branch
70 tube bend drainage conduit
72 drainage valve
74 flange drainage conduit
76 flange at T-piece
78 T-piece

The invention claimed is:

1. Mixing and metering device for mixing and metering liquid chemicals comprising:
   a circulation pump having a suction port and a pressure port,
   a tube coil, the content volume of which is dimensioned such that the chemicals metered into the device have a residence time sufficient for a chemical reaction of the chemicals;
   a choke tube which guides the circulation stream exiting from the tube coil, with formation of a choke point, from an outlet of the tube coil to a metering conduit which is arranged between the choke tube and the suction port of the circulation pump,
   at least two metering valves and a falling tube which is connected to the choke tube and has a vacuum flange for connection of the mixing and metering device to a vacuum device, and
   wherein the tube coil is arranged standing up vertically and has an inlet at the bottom and an outlet at the top wherein the choke tube guides a circulation stream downwards from the outlet of the tube coil downwards to the metering conduit which is horizontally arranged between the choke tube and the suction port of the circulation pump, and wherein the falling tube is connected to an end of the choke tube arranged above the level of the tube coil, and, at a lower end, comprises the vacuum flange for connection of the mixing and metering device to the vacuum device.

2. Mixing and metering device according to claim 1, wherein the metering valves are glandless and in the shape of bellows valves.

3. Mixing and metering device according to claim 1, wherein the circulation pump is a rotary pump.

4. Mixing and metering device according to claim 1, wherein the tube coil is arranged like a meander as an upright standing flat tube coil.

5. Mixing and metering device according to claim 1, wherein the choke tube is connected to a drainage flange of the tube coil through a flange stub at a T-piece.

6. Mixing and metering device according to claim 5, wherein, at the top at the T-piece, a tube reduction piece is connected.

7. Mixing and metering device according to claim 5, wherein, at the T-piece, a riser tube is connected by which the choke tube is prolonged beyond the level of the tube coil.

8. Mixing and metering device according to claim 7, wherein the inner diameter $d_{tube}$ of the choke tube, of the falling tube as well as the inner diameter of the tube coil are selected such that, with a predetermined pump capacity $Q_{pump}$ (m³/s) of the circulation pump and with predetermined dynamic viscosity μR (m²/s) of a reaction material, for the Reynolds number RE $$RE = Q_{pump}/(0.25 * \Pi * d_{tube} \mu R) > 2300$$

is true and wherein
the inner diameter $d_{iF}$ (m) of the falling tube is so wide that, with respect to the film thickness $S_{film}$ (m) of the reaction material flowing downwards at the inner side of the falling tube:

$$S_{film} \leq d_{iF}/6$$

is true.

9. Mixing and metering device according to claim 1, wherein the inner diameter of the falling tube is lower than the inner diameter of the choke tube.

10. Mixing and metering device according to claim 1, wherein a hydraulic connection between the falling tube and a riser tube comprises a transfer conduit.

11. Mixing and metering device according to claim 10, wherein the transfer conduit is arranged with respect to its height level, above an upper-most tube of the tube coil.

12. Mixing and metering device according to claim 1, wherein a drainage conduit with a drainage valve is provided between the suction port of the circulation pump and the falling tube.

* * * * *